US009008607B2

(12) United States Patent
Ibbotson

(10) Patent No.: US 9,008,607 B2
(45) Date of Patent: Apr. 14, 2015

(54) INCIDENT AWARE SERVICE OPERATIONS FOR WIRELESS INFRASTRUCTURE

(71) Applicant: Motorola Solutions, Inc., Schaumburg, IL (US)

(72) Inventor: Craig A. Ibbotson, Crystal Lake, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 246 days.

(21) Appl. No.: 13/687,137

(22) Filed: Nov. 28, 2012

(65) Prior Publication Data
US 2014/0148115 A1    May 29, 2014

(51) Int. Cl.
*H04M 11/04* (2006.01)
*H04W 4/22* (2009.01)
*H04W 24/04* (2009.01)
*H04W 4/00* (2009.01)
*H04W 4/10* (2009.01)

(52) U.S. Cl.
CPC ............ *H04W 4/22* (2013.01); *H04W 24/04* (2013.01); *H04W 4/008* (2013.01); *H04W 4/10* (2013.01)

(58) Field of Classification Search
CPC ...... H04W 4/22; H04W 76/007; H04W 76/02
USPC ........ 455/404.1–404.2, 428, 435.1, 438, 439, 455/445, 446, 456.1
See application file for complete search history.

(56) References Cited

U.S. PATENT DOCUMENTS

| 5,555,444 | A | 9/1996 | Diekelman et al. |
| 6,389,282 | B1 * | 5/2002 | Hirsch ......................... 455/423 |
| 6,628,933 | B1 * | 9/2003 | Humes ....................... 455/404.1 |
| 6,907,237 | B1 | 6/2005 | Dorenbosch et al. |
| 7,221,928 | B2 | 5/2007 | Laird et al. |
| 7,395,151 | B2 | 7/2008 | O'Neill et al. |
| 7,411,493 | B2 | 8/2008 | Smith |
| 7,716,077 | B1 | 5/2010 | Mikurak |
| 8,171,415 | B2 | 5/2012 | Appleyard et al. |

(Continued)

FOREIGN PATENT DOCUMENTS

EP    2391177 A1    11/2011

OTHER PUBLICATIONS

Corresponding International Application No. PCT/US2013/069416—International Search Report with Written Opinion—Mailing Date May 19, 2014—11 pages.

*Primary Examiner* — Dai A Phuong
(74) *Attorney, Agent, or Firm* — Daniel R. Bestor

(57) ABSTRACT

In a two-way radio frequency (RF) communications system having a plurality of subscriber units (SUs) and a supporting infrastructure including a wireless core network, a service request is received indicating one of a device, application, and transport link that will be removed from service. One or more SUs out of the plurality of SUs are identified that will be impacted by the removal from service. A determination is then made of whether any one of the SUs is currently involved in an incident response. For each SU determined to be currently involved in an incident response, it is determined whether the respective incident response is of a non-interruptible incident response type. Responsive to determining that a SU is currently involved in a non-interruptible incident response, a notification is caused to appear at a network management console or a dispatch console, and the service request is at least temporarily suspended.

20 Claims, 6 Drawing Sheets

(56) References Cited

U.S. PATENT DOCUMENTS

| | | |
|---|---|---|
| 2005/0037769 A1* | 2/2005 | Jami et al. ............... 455/453 |
| 2005/0075116 A1 | 4/2005 | Laird et al. |
| 2006/0126580 A1* | 6/2006 | Katsumata et al. ........ 370/338 |
| 2006/0178128 A1* | 8/2006 | Eaton et al. ............ 455/404.1 |
| 2009/0082041 A1* | 3/2009 | Ranganathan et al. ..... 455/458 |
| 2009/0313562 A1 | 12/2009 | Appleyard et al. |
| 2011/0124312 A1* | 5/2011 | Kwon et al. ............ 455/404.2 |
| 2011/0194493 A1* | 8/2011 | Centonza et al. .......... 370/328 |
| 2011/0280178 A1 | 11/2011 | Heifner |
| 2012/0178452 A1 | 7/2012 | Reagan et al. |
| 2012/0188074 A1 | 7/2012 | Williams et al. |
| 2012/0218899 A1* | 8/2012 | Ozawa ..................... 370/237 |

\* cited by examiner

INCIDENT AWARE SERVICE OPERATIONS FOR WIRELESS INFRASTRUCTURE

FIELD OF THE DISCLOSURE

The present disclosure relates generally to wireless communication systems and minimizing disruptions to responding subscriber units due to service operations conducted on supporting infrastructure.

BACKGROUND OF THE DISCLOSURE

Wireless communication systems provide for radio communication links to be arranged within the system between a plurality of user terminals. Such user terminals may be mobile and may be known as 'mobile stations' or 'subscriber units.' At least one other terminal, e.g. used in conjunction with subscriber units, may be a fixed terminal, e.g. a base station, repeater, access point, and/or eNodeB. Such a system typically includes a system infrastructure which generally includes a network of various fixed terminals, which are in direct radio communication with the subscriber units. Each of the fixed terminals operating in the system may have one or more transceivers which may, for example, serve subscriber units in a given local region or area, known as a 'cell' or 'site', by radio frequency (RF) communication. The subscriber units that are in direct communication with a particular fixed terminal are said to be served by the fixed terminal. In one example, all radio communications to and from each subscriber unit within the system are made via respective serving fixed terminals. Sites of neighboring fixed terminals in a wireless communication system may be offset from one another or may be non-overlapping or partially or fully overlapping.

Wireless communication systems may operate according to an industry standard land mobile radio (LMR) protocol such as, for example, the Project 25 (P25) standard defined by the Association of Public Safety Communications Officials International (APCO), or other radio protocols, the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. Broadband wireless communication systems generally providing higher bandwidths for data, video, audio, and/or voice may also operate, alongside or in place of the LMR protocols, according to an industry standard protocol such as, for example, an open media alliance (OMA) push to talk (PTT) over cellular (OMA-PoC) standard, a voice over IP (VoIP) standard, or a PTT over IP (PoIP) standard. Protocols such as PoC, VoIP, and PoIP are implemented over broadband RANs including third generation and fourth generation networks such as third generation partnership project (3GPP) Long Term Evolution (LTE) networks.

Communications in accordance with any one or more of these standards, or other standards, may take place over physical channels in accordance with one or more of a TDMA (time division multiple access), FDMA (frequency divisional multiple access), or CDMA (code division multiple access) protocol. Subscriber units in wireless communication systems such as those set forth above send user communicated speech and data, herein referred to collectively as 'traffic information', in accordance with the designated protocol.

Many so-called "public safety" wireless communication systems provide for group-based radio communications amongst a plurality of subscriber units such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another while avoiding the random transmissions of subscriber units users outside of the local police force. Public safety group-based radio communications generally demand high availability, but are subject to unpredictable intermittent use by group members that is dictated by the random occurrence of emergency incidents that do not occur at any pre-scheduled or predictable pattern.

However, situations may arise where upgrades, preventive maintenance, fault recovery, or some other operation (e.g., a service request) on the RAN requires some portion of the RAN to be taken out of service, including but not limited to a fixed terminal, a backhaul link, a device in the RAN core network, an application running on an application server, the application server itself, or some other transport link within a RAN core network. In conventional systems, such operations are generally scheduled during off-peak hours, and the existence of any currently active incidents perhaps manually confirmed via voice transmission with a dispatch center before the operations are executed and RF communications services potentially interrupted or degraded.

However, with the continued move towards high-bandwidth and high density broadband RAN communications systems, it is getting more difficult to determine what radio sites will be impacted by any particular service operation, and more difficult still to determine what subscriber units will be impacted and whether any of those subscriber units are involved in an incident response and would be negatively affected by the service operation during a critical time. Furthermore, manual verification of incident activity is prone to error and requires verbal dissemination of information across one or more organizations that is not always possible to maintain in a consistent manner under varying circumstances and across varying personnel. Accordingly, what is needed is an improved system, device, and method for handling service requests for performing service operation requests on RAN communications systems.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
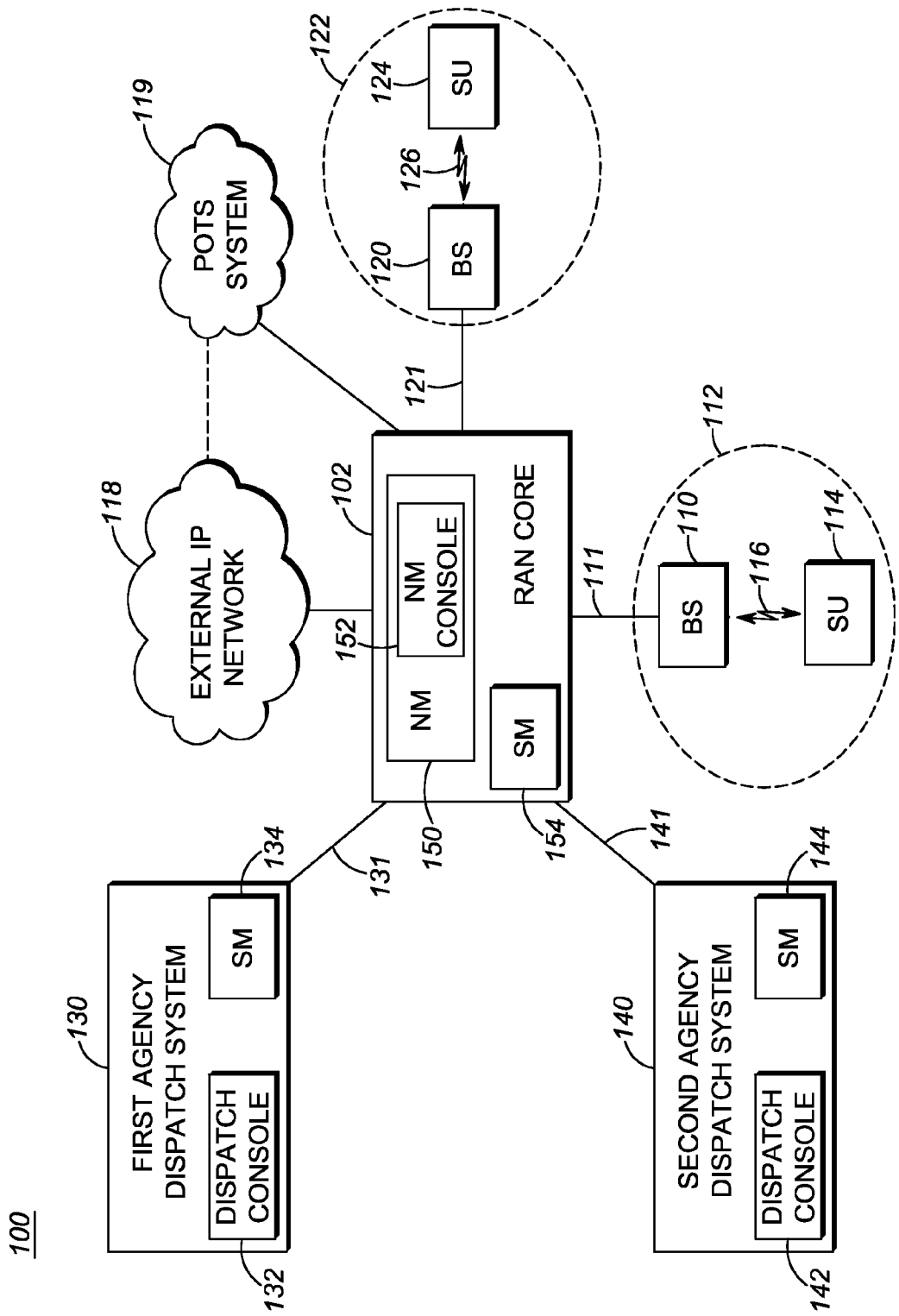
FIG. 1 is a schematic diagram of a wireless communication system in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

In light of the foregoing, it would be advantageous to provide for an improved system, device, and method that is capable of automatically determining what radio sites and/or applications will be impacted by any particular service operation, what subscriber units will be impacted, and whether any of those subscriber units are involved in an emergency incident and would be negatively affected by a service operation identified in the service request.

More specifically, the present disclosure sets forth a method, device, and system in a two-way radio frequency (RF) communications system having a plurality of subscriber units (SUs) and a supporting infrastructure including a wireless core network, for more intelligently and efficiently handling service requests. A service request is received indicating one of a device, application, and transport link that will be removed from service. One or more SUs out of the plurality of SUs are identified that will be impacted by the removal from service. A determination is then made of whether any one of the SUs is currently involved in an incident response. For each SU determined to be currently involved in an incident response, it is determined whether the respective incident response is of a non-interruptible incident response type. Responsive to determining that a SU is currently involved in a non-interruptible incident response, a notification is caused to appear at a network management console or a dispatch console, and the service request is at least temporarily suspended.

Additionally, the present disclosure sets forth a network management computing device operating in a wireless core network of a two-way RF communications system having a plurality of SUs and a supporting infrastructure, the network management computing device configured to more intelligently and efficiently handle service requests. A service request is received at the network management computing device indicating one of a device, application, and transport link that will be removed from service. One or more SUs out of the plurality of SUs are identified by the network management computing device that will be impacted by the removal from service. A determination is then made by the network management computing device of whether any one of the SUs is currently involved in an incident response. For each SU determined to be currently involved in an incident response, the network management computing device determines whether the respective incident response is of a non-interruptible incident response type. Responsive to determining that a SU is currently involved in a non-interruptible incident response, the network management computing device causes a notification to appear at a network management console or a dispatch console, and the service request is at least temporarily suspended.

Each of the above-mentioned embodiments will be discussed in more detail below, starting with example network and device architectures of the system in which the embodiments may be practiced, followed by a discussion of subscriber unit impact identification and determination of incident responses and incident response types, if any, of incidents that subscriber units are currently responding to. Further advantages and features consistent with this disclosure will be set forth in the following detailed description, with reference to the figures.

I. Network and Device Architectures

FIG. 1 shows a wireless communication system 100 which may be adapted in accordance with an embodiment of the disclosure. It will be apparent to those skilled in the art that the system 100 and the components which are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system capable of operating in accordance with any one or more standard protocols, such as the APCO P25 standard, the DMR standard, the TETRA standard, or the LTE standard, among other possibilities.

The system 100 shown in FIG. 1 includes a radio access network (RAN) core 102, one or more fixed terminals (e.g., base stations/repeaters/access points/eNodeBs) (BSs) 110, 120, which may be operably connected to the RAN core 102 via respective wired or wireless links 111, 121. While the term BS will be used to refer to the fixed terminals 110, 120, for ease of reference, it should be noted that the fixed terminals 110, 120 may, in some embodiments, be a repeater, access point, eNodeB, or some other wireless distribution terminal.

The BS 110 has radio links 116 with one or more subscriber units, such as subscriber unit (SU) 114 in a service cell or site 112 at least partially defined by a geographic location of the BS 110. In addition, BS 110 may maintain a direct wireless or wired link 111 with the RAN core 102. In one embodiment, the BS 110 serves SUs including the SU 114 with radio communications to and from other terminals, including (i) other SUs served by the BS 110, (ii) SUs served by other BSs such as BS 120, (iii) other terminals including SUs in other systems (not shown) operably linked to the system 100 via the RAN core 102 and one or more other networks such as the external IP network 118 or the plain old telephone service (POTS) system 119, and (iv) one or more agency dispatch systems (such as first agency dispatch system 130 and/or second agency dispatch system 140) via the RAN core 102 and wired or wireless dispatch communications links 131, 141.

BS 120 similarly has radio links 126 with one or more subscriber units, such as SU 124 in a service cell or site 122 at least partially defined by a geographic location of the BS 120. In addition, BS 120 may maintain a direct wireless or wired link 121 with the RAN core 102. In one embodiment, the BS 120 serves SUs including the SU 124 with radio communications to and from other terminals, including (i) other SUs served by the BS 120, (ii) SUs served by other BSs such as BS 110, (iii) other terminals including SUs in other systems (not shown) operably linked to the system 100 via the RAN core 102 and one or more other networks such as the external IP network 118 or the plain old telephone service (POTS) system 119, and (iv) one or more agency dispatch systems 130, 140 via the RAN core 102 and wired or wireless dispatch communications links 131, 141.

The RAN core 102 includes known sub-systems (not shown) required for operation of the system 100. Such sub-systems may include, for example, sub-systems providing authentication, routing, SU registration and location, system management, and other operational functions within the system 100. The RAN core 102 may also provide routes to other BSs (not shown) providing cell sites serving other SUs, and/ or may provide access to other types of networks such as the POTS system 119 or the external IP network 118, which may be the Internet. The RAN core 102 may also maintain separate dispatch communications links 131, 141 to the agency dispatch systems 130, 140 for supporting console-initiated and console-participatory group voice calls with each agency dispatch system's respective dispatch console 132, 142 and/or for allowing collaborative configuration, tracking, and transmission of active incident information, subscriber unit attachment information, and application subscription information between the RAN core 102 and the agency dispatch systems 130, 140.

Included within the RAN core 102 is a network management sub-system 150 for monitoring the performance of the system 100 and for identifying and initiating service operations on devices, applications and/or links. The network management sub-system 150 provides a network management console 152 that, alone or in combination with one or more separate network management computing devices, provides user interface (input) and display (output) capabilities that allow a technician to monitor the performance of the system 100 and receive service requests that identify one of the devices, applications, and/or links to be removed from service for repair or replacement. For example, the network management sub-system 150, including the network management console 152, may keep track of transmission error rates across particular links or at particular devices (such as fixed terminals), may poll individual devices to ensure that they are fully operational, and/or perform other tasks to actively ensure that the system 100 is, and remains, highly available for subscriber units such as SUs 114 and 124.

Also included within the RAN core 102, may be a services manager sub-system 154, including one or more services manager computing devices, for tracking subscriber unit location and attachment information, subscriber unit application subscription information, current routes to particular subscriber units, and/or currently active incidents and subscriber units associated with each currently active incident, among other information. In some embodiments, and as illustrated in FIG. 1, the services manager sub-system 154 may fully or partially exist in the RAN core 102. In other embodiments, services manager computing devices and functions may be maintained at each individual agency dispatch system, via separate services manager sub-systems 134 and 144 maintained at each agency dispatch system 130, 140. For example, services manager information may be stored at each individual agency dispatch system for subscriber units associated with each agency dispatch system, and cached locally at the services manager sub-system 154 in the RAN core 102 for ease and quickness of access to the information by other devices in the RAN core 102. In other embodiments, no services manager sub-system 154 may exist in the RAN core 102, and instead, services manger devices and functions implemented at the separate agency dispatch systems and made accessible to the RAN core 102 via requests for information transmitted over respective links 131, 141 to services manager sub-systems 134 and 144 (each having one or more services manager computing devices).

Figure 2A:
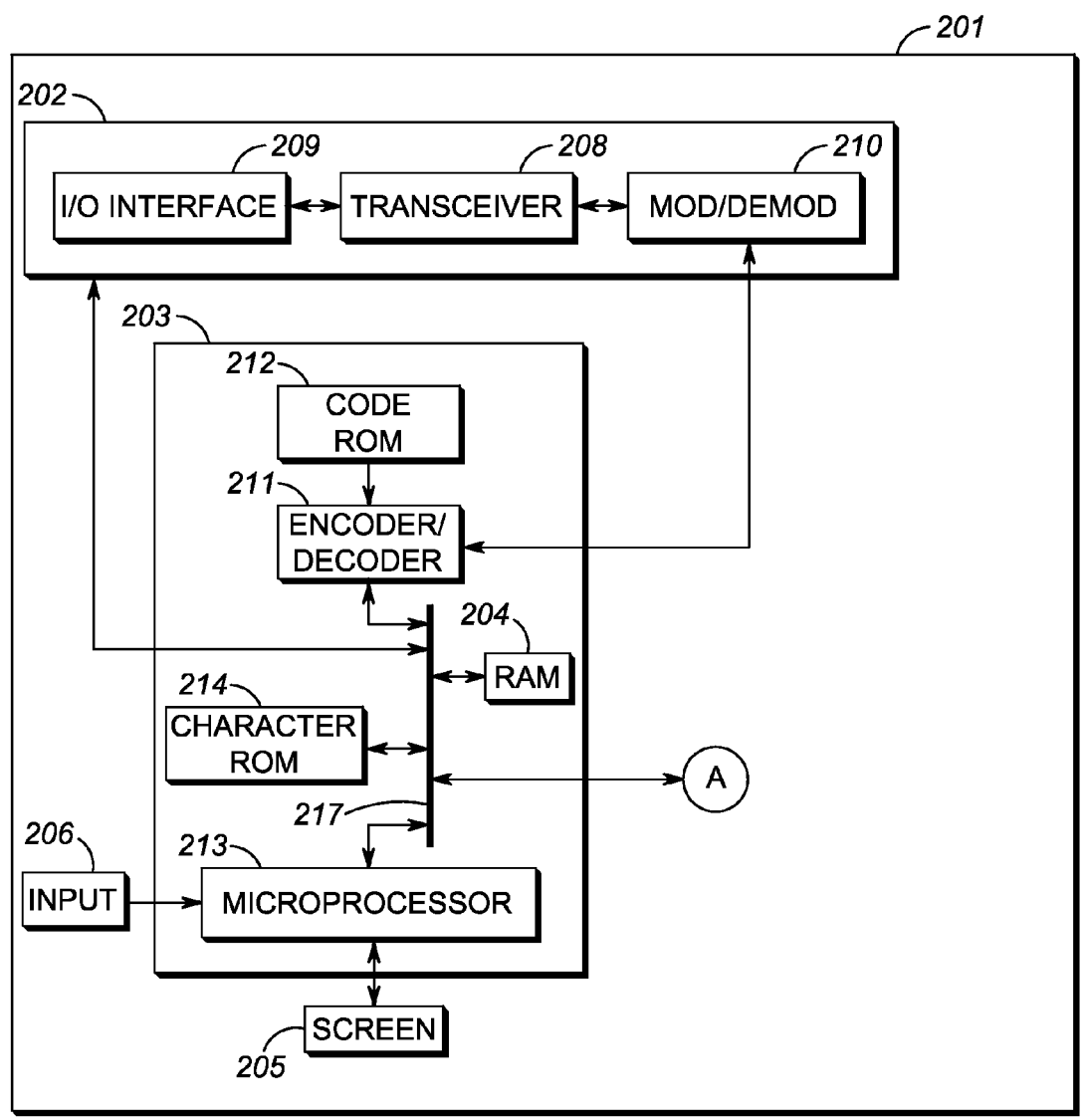
FIGS. 2A and 2B set forth a block diagram of an illustrative layout of a network management computing device/console in accordance with an embodiment of the present disclosure.
Figure 2B:
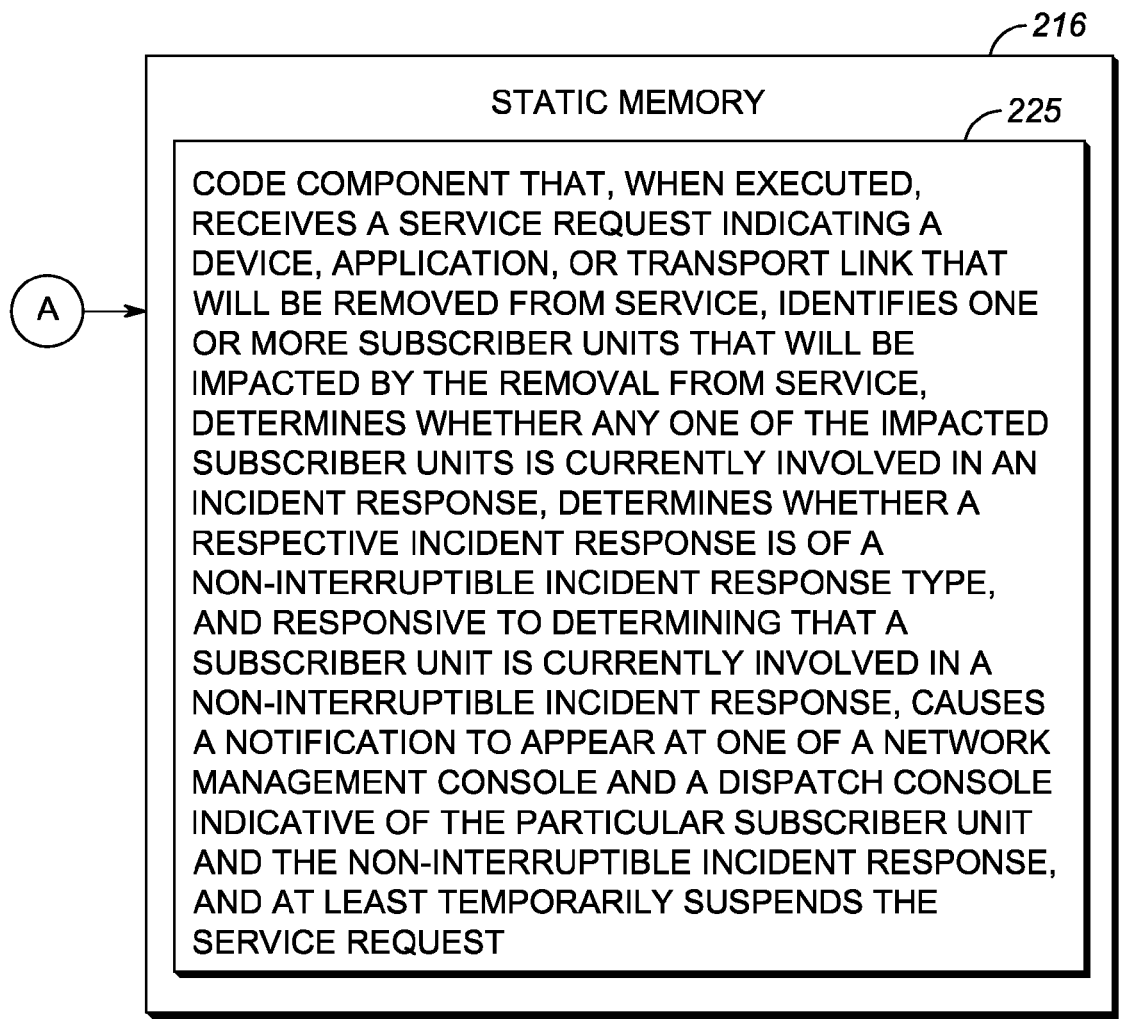

FIGS. 2A and 2B set forth an example functional block diagram of a network management console 201 such as network management console 152 operating within the network management sub-system 150 of FIG. 1 in accordance with some embodiments. As shown in FIG. 2A, network management console 201 includes a communications unit 202 coupled to a common data and address bus 217 of a processing unit 203. The network management console 201 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for encoding and decoding voice, data, control, or other signals that may be transmitted or received between other devices in the system 100, such as fixed terminals 110, 120 and agency dispatch systems 130, 140. The processing unit 203 may further include a microprocessor 213 coupled, by the common data and address bus 217, to the encoder/decoder 211, a character ROM 214, a Random Access Memory (RAM) 204, and a static memory 216 (see FIG. 2B).

The communications unit 202 may include one or more wired or wireless input/output (I/O) interfaces 209 that are configurable to communicate with other devices within the system 100. The communications unit 202 may include one or more wireless transceivers 208, such as a DMR transceiver, an APOCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 202 may additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding or encoding data such as control channel messages and/or data or voice messages that may be transmitted or received by the BS 101. Static memory 216 (see FIG. 2B) may store operating code for the microprocessor 213 that, when executed, receives a service request indicating a device, application, or transport link that will be removed from service, identifies one or more subscriber units that will be impacted by the removal from service, determines whether any one of the subscriber units is currently involved in an incident response, determines whether a respective incident response is of a non-interruptible incident response type, and responsive to determining that a subscriber unit is currently involved in a non-interruptible incident response, causes a notification to appear at one of a network management console and a dispatch console indicative of the particular subscriber unit and the non-interruptible incident response, and at least temporarily suspends the service request, in accordance with one or more processing steps or message transmissions and/or receptions of FIGS. 3-4 and corresponding text. In other embodiments, one or more separate network management computing devices in network management sub-system 150, perhaps having a same or similar structure as network management console 150, may perform some of the functions of the network management console (e.g., those not requiring a user input/output interface, which exists only at the network management console). Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

II. Incident Aware Service Operations Process Flow

Figure 3A:
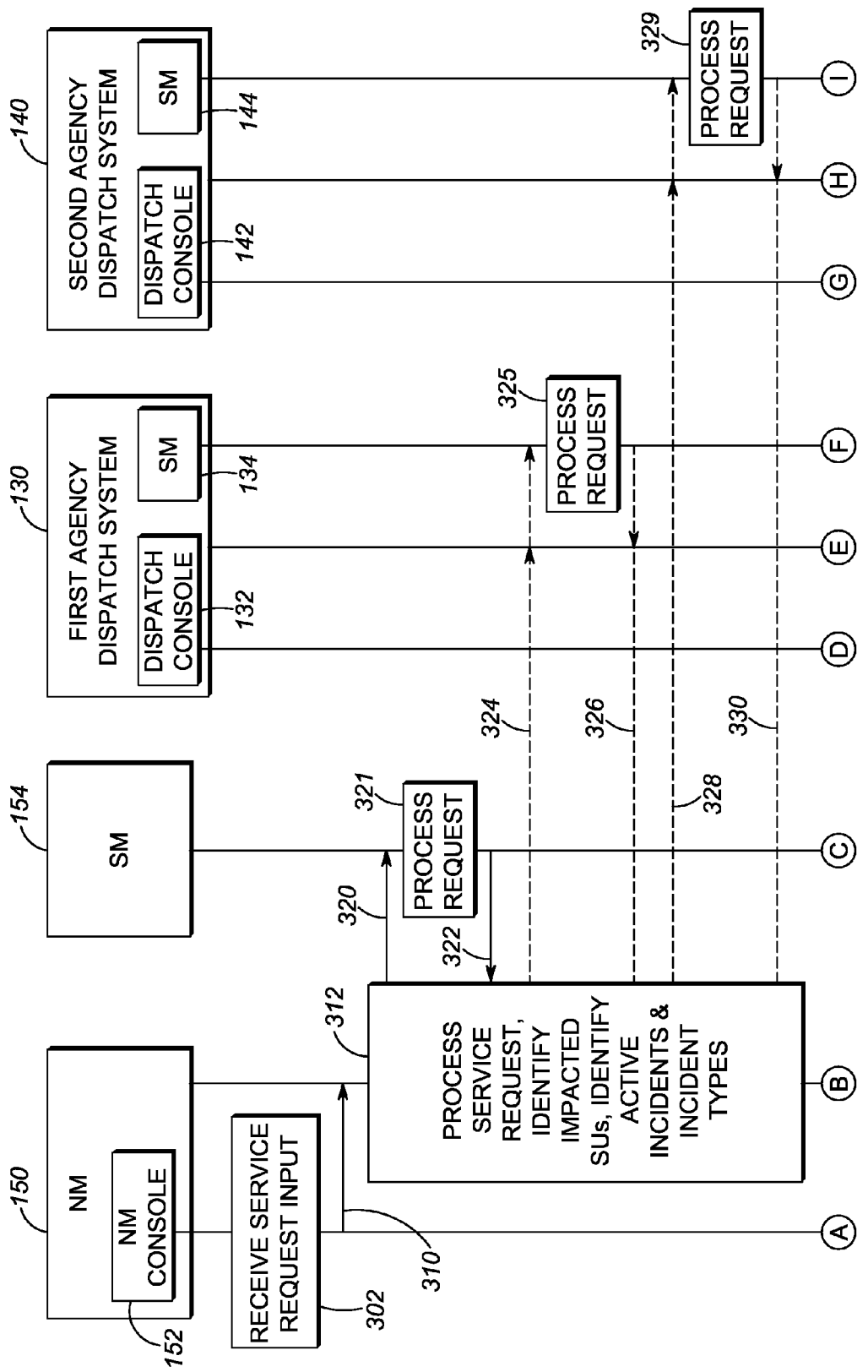
FIGS. 3A and 3B set forth a ladder diagram illustrating a message flow and processing steps executed by devices in the wireless communication system of FIG. 1 in accordance with an embodiment of the present disclosure.
Figure 3B:
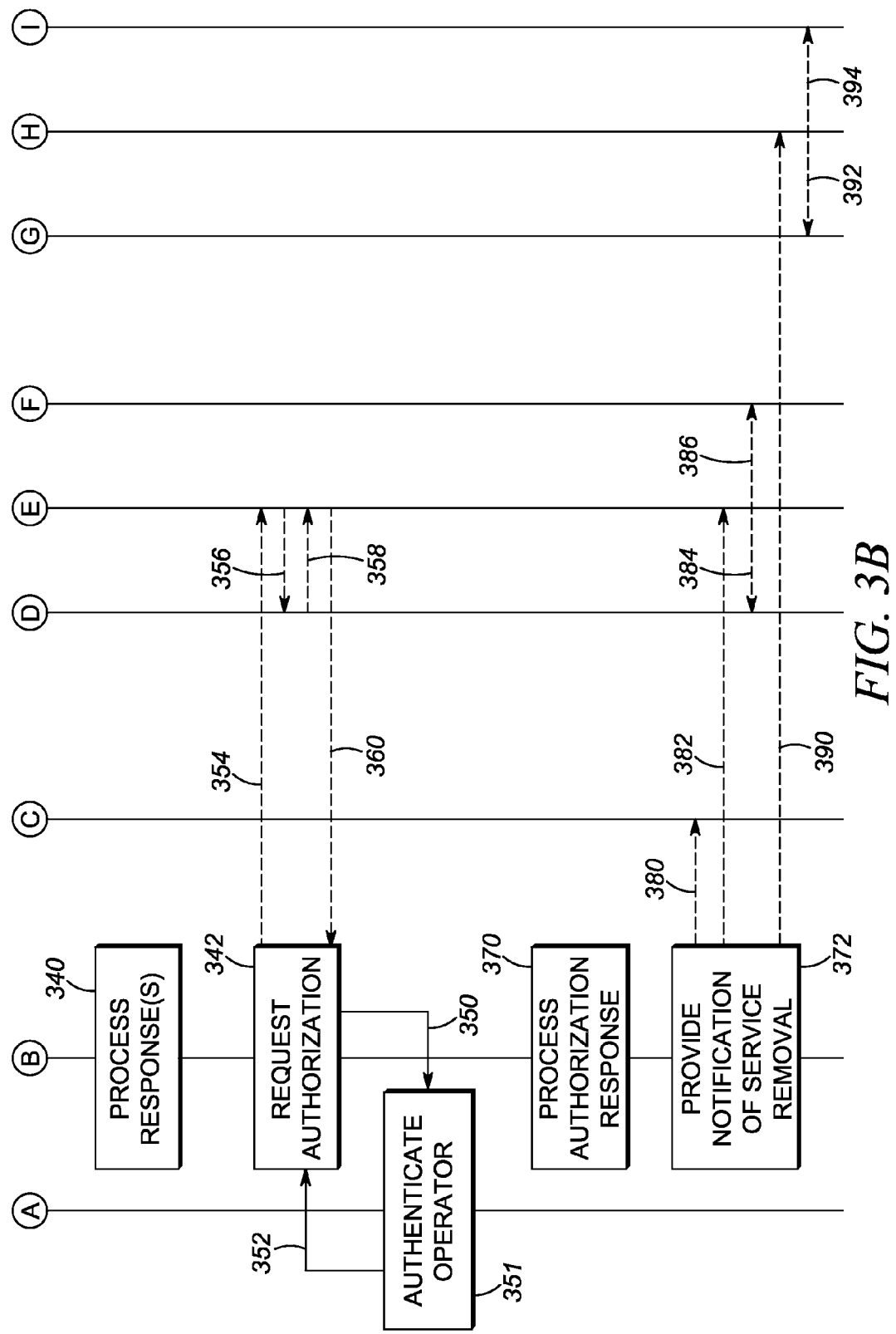

FIGS. 3A and 3B set forth a ladder diagram illustrating message transmission and processing steps used in system 100 to receive, process, and act on a service request received at a console 152 of a network management sub-system 150 of a RAN core, in cooperation with a services manager sub-system 154, a first agency dispatch system 130 (including first agency dispatch console 132 and services manager sub-system 134), and a second agency dispatch system 140 (including second agency dispatch console 142 and services manager sub-system 144). At step 302, the network management console 152 detects a service request input. For example, and as illustrated in FIGS. 1 and 2, the network management console 152 may be disposed within the network management sub-system 150 and may receive a service request via an input interface 206. In other embodiments, the service request may come from a subscriber unit in the field and may be routed to the network management console 152 via a remote interface (not shown) of the network management console 152 and one or more fixed terminals such as base stations 110 or 120. Other possibilities exist as well.

The service request received at step 302 is then forwarded to a network management computing device in the network management sub-system 150, which as set forth above, may in some embodiments be the console 152 itself or a separate network management computing device within the network management sub-system 150. At step 312, the network management computing device processes the service request, identifies subscriber units that would be impacted by the service request, identifies which of those impacted subscriber units, if any, are currently involved in an incident response, and for those so involved, the type of incident response involved in.

In order to obtain information necessary to identify impacted subscriber units and current incident responses, the network management computing device may query the local services manager sub-system 154 and/or remote services manager sub-systems 134, 144 via requests for information. In an embodiment in which a services manager sub-system 154 is available at the RAN core 102, the network management sub-system 150 may locally query one or more services manager computing devices in the services manager sub-system 154 via an information request message 320. The information request message 320 may be a request for information regarding, for example, attachment information and may include an identification of a particular fixed terminal (such as BS 110 or 120 of FIG. 1) that is identified in the service request as a candidate for service. At step 321, and responsive to receiving the request message 320, one or more services manager computing devices in local services manager sub-system 154 accesses stored attachment information (or other information) and provides, in response message 322, identities of one or more subscriber units that are attached to the fixed terminal (or other information) and would thus be impacted by the removal. For example, if the fixed terminal identified in the information request message 320 was BS 110, the response message 322 may include an identifier associated with subscriber unit 114.

The information request message 320 may request other information as well. For example, the information request message 320 may request information regarding a particular application server or application (running on an application server) that was identified in the service request as a candidate for service. In this case, and similarly, at step 321, the one or more services manager computing devices in local services manager sub-system 154 accesses stored information identifying subscriber units that are currently subscribed to or using the particular application server or application identified in the service request. For example, if the service request identified a messaging service or application server running the messaging service as a candidate for removal or repair, the one or more services manager computing devices in local services manager sub-system 154 could access stored information identifying subscriber unit 114 as being currently subscribed to or using the messaging service. Other examples are possible as well.

Additionally, the network management sub-system 150 may maintain a data store of transmission routes and RAN core 102 devices and their associated impact on fixed terminals and subscriber units. For example, the network management sub-system may be preconfigured with route information such that a service request received via console 152 to remove a particular router, gateway, or switch from service in the RAN core 102 can be determined to effect service at one or both of the fixed terminals BS 110 and BS 120 of FIG. 1, and along with information obtained via services manager sub-system 154 and/or remote services manager sub-systems 134, 144, provides the network management sub-system 150 with sufficient information to determine whether it can proceed with the service request or not.

In an embodiment in which the services manager sub-system 154 is not available at the RAN core 102, the network management sub-system 150 may remotely query separate services manager sub-systems 134 and 144 maintained at each agency dispatch system 130, 140 via separate information request messages 324 and 328 (illustrated with dashed lines in FIG. 3A). The information request messages 324, 328 may be the same or similar to the information request message 320, except addressed to the services manager sub-systems 134, 144 in the remote agency dispatch systems 130, 140. At steps 325 and 329, and responsive to receiving the respective request messages 324, 328, one or more of the services manager sub-systems 134, 144 access stored attachment information (or, in other embodiments, other information) and provide, in response messages 326, 330, identities of one or more subscriber units that are attached to the fixed terminal and would thus be impacted by the removal (or other information). For example, if the fixed terminal identified in the information request message 320 was fixed terminal BS 110, one or both of the response messages 326, 330 may include an identifier associated with subscriber unit 114 (e.g., depending on the agency or agencies that the subscriber unit 114 was associated with).

In addition to affected subscriber unit information (such as attachment information or application subscription information), the network management computing device must also determine, of those subscriber units determined as being affected by the service request, which (if any) are currently involved in an incident response. In addition, for those subscriber units determined to currently be involved in an incident response, the network management computing device must ascertain the type of incident response in order to determine whether the response is an interruptible or a non-interruptible type of incident response. In one embodiment, information request messages 320, 324, 328 may be modified to also request current incident information for those subscriber units identified as affected by the service request. In another embodiment, additional information request messages could be transmitted, similarly to information request messages 320, 324, and 328, identifying the impacted subscriber units previously identified in response messages 322, 326, and/or 330, and separately requesting current incident response information for the identified impacted subscriber units. In still another embodiment, the additional information request messages could be transmitted to the dispatch consoles 132, 142 at each agency dispatch system 131, 141, instead of to the services manager sub-systems 134, 144. The individual dispatch consoles 132, 142 could then access local incident response information relative to the subscriber units identified in the additional information request messages and provide responses similar to response messages 326, 330 identifying incident response types, if any, that the subscriber units may be currently involved in.

At step 340, the network management computing device processes the responses received at step 312. For example, the network management computing device may aggregate the data received from one or more of local network management sub-system information, information responses from the local services manager sub-system 154, information responses from remote services manager sub-systems 134, 144, and/or information responses from remote dispatch consoles 132, 142. For example, the network management computing device may aggregate the information responses in the following manner, as set forth in Table II. Of course, other methods of aggregating the received data, including more or less data, could be implemented at the network management computing device in accordance with other embodiments.

TABLE II

Example Information Response Aggregated Data

| Service Request ID | Impacted System Elements | Impacted Subscriber Units | Current Incident Response/Type |
|---|---|---|---|
| $0001_{16}$ | Wired Link 111 BS 110 | SU 114 | <Null> |
| $0002_{16}$ | Switch in RAN Core 102 Wired Link 121 BS 120 | SU 124 | Police Action |

For example, a first service request having an assigned identifier of $0001_{16}$ received at console 152 may indicate a need to operate on the wired link 111 of FIG. 1, and thus necessitate the removal from service of fixed terminal BS 110 as well. After querying and receiving responses from one or more services manager sub-systems and/or dispatch consoles, the network management computing device may determine that SU 114 is the only impacted subscriber unit, and that it is not currently involved in an incident response (e.g., the Current Incident Response/Type for SU 114 is set to <Null>). In another example, a second service request having an assigned identifier of $0002_{16}$ received at console 152 may indicate a need to operate on a switch in RAN core 102 that couples the wired link 121 to the RAN core, and thus necessitates the removal from service of wired link 121 and fixed terminal BS 120 as well. After querying and receiving responses from one or more services manager sub-systems and/or dispatch consoles, the network management computing device may determine that SU 124 is the only impacted subscriber unit, and that it is currently involved in an incident police action response (e.g., the Current Incident Response/Type for SU 124 is set to Police Action). In some embodiments, the Current Incident Response/Type may use three-digit police codes, which may vary by jurisdiction. For example, in some jurisdictions, a "240" code is an assault and a "488" is a petty theft, and these three-digit police codes may be used to populate the Current Incident Response/Type field.

Based on the determined incident response type(s) of impacted subscriber units, if any, at step 340, the network management computing device determines whether to allow the service request to proceed. There may be several levels of incident response types, each with their own set of rules. For example, a highest priority incident response type may never be interruptible. A medium priority incident response type may be interruptible with authorization from an authorized operator. And a lowest priority incident response type may always be interruptible. In other examples, more than three priority levels may be provided, and in still other examples, only two of the three priority levels may be provided. Examples of a highest priority non-interruptible incident response type may include an intelligence agency activity or federal response force activity. A medium priority non-interruptible incident response type may include a fire or policy response activity (including, for example, the "240" code for an assault set forth above). A lowest priority interruptible incident response type may include no incident response (<Null>), a non-life threatening and/or time-critical response (such as the "488" code for a petty theft set forth above), or a civilian activity, for example.

If more than one priority level incident response type is returned for a particular service request, the network management computing device may consider only the highest priority level incident response type in deciding how to respond to the service request. For example, if only a lowest priority interruptible incident response type were returned relative to a particular service request, the network management computing device may allow the service request to proceed (not illustrated in FIGS. 3A and 3B). On the other hand, if a highest priority non-interruptible incident response type and a lowest priority interruptible incident response type were returned relative to a particular service request, the network management computing device may ignore the lowest priority interruptible incident response type and, due to receipt of the highest priority non-interruptible incident response type, prevent the service request from proceeding, perhaps returning an error notification to the device that generated the service request (e.g., network management console 152 in FIGS. 3A and 3B or one of the subscriber units operating through a remote console interface of network management console 152) indicating that the service request cannot proceed at this time due to a current highest priority non-interruptible incident response type involving an impacted subscriber unit.

In an example illustrated in FIG. 3B in which a medium priority non-interruptible incident response type is returned to the network management computing device (perhaps in addition to one or more lower priority interruptible incident response types), at step 342, the network management computing device may temporarily suspend the service request while it attempts to secure authorization to proceed with the service request. Authorization may be obtained from a number of different sources. For example, and as illustrated in FIG. 3B, an authorization request message 350 may be transmitted to and displayed at the network management console 152. In response to receiving the authorization request message 350, the network management console 152 may display an authorization override option, perhaps to the same user or different user than entered the initial service request at step 302, noting that authorization is required to proceed with the service request due to the existence of a non-interruptible incident response involving a subscriber unit that would be impacted by the service request (e.g., would experience an absence of application or wireless communication services or reduced services such as a lower signal strength, a higher bit error rate, high latency, or dropped voice frames, among other issues). In an embodiment in which authentication is required, a number of varying authentication steps could be executed by the network management console 152 before allowing the service request to proceed. For example, the network management console 152 could require the entry of one or more of an authorized username, an authorization password, an authorized username and corresponding password combination, a swipe of a smartcard associated with an authorized operator, a challenge/response known only to an authorized operator, and a biometric scan associated with an authorized operator, among other possibilities.

In addition to the authorization override option, a dialog box could also be displayed, providing information regarding the impacted subscriber unit(s) and the incident response type(s) that the impacted subscriber unit(s) are involved in, to aid the authorized operator at the network management console 152 (which may be the same or different from the user that entered the original service request at step 302) in determining whether to authorize the service request. Once authentication input is received, the network management console 152 itself or the network management computing device, perhaps in association with one or more remote authentication servers, may determine whether the authentication was successful, and if so, allow the service request to proceed. In one embodiment, and as illustrated in FIG. 3B, the network management console 152 may receive authentication information at step 351 and provide the authentication information back to the network management computing device in the network management sub-system 150 in authentication response message 352. The network management computing device may then make the final authorization determination with respect to the service request, perhaps after authenticating or otherwise validating the authentication information on its own or with the aid of a remote authentication server.

In an embodiment in which a simple override is sufficient, without any authentication steps, an override option may be displayed on a screen (e.g., perhaps a display 205) at the network management console 152, allowing the operator to override the delaying of the service request without providing any further authentication credentials or taking any further authentication steps. For example, a dialog box could be displayed, providing information regarding the impacted subscriber unit(s) and the incident response type(s) that the impacted subscriber unit(s) are involved in, and inquire whether the operator wants to continue with the service request. The operator could then select a "yes" or "no" option to either proceed with the service request or not.

In another embodiment, and as illustrated in FIG. 3B via dashed lines, instead of or in addition to requesting authorization from network management console 152 in the network management 150 sub-system, authorization request message 354, 360 may be transmitted to and displayed at the dispatch console 132 at the first agency dispatch system 130 that is servicing an impacted subscriber unit involved in one or more non-interruptible incident responses. A similar authorization request message could be transmitted to dispatch console 142 in second agency dispatch system 140, not illustrated in FIGS. 3A and 3B. In response to receiving the authorization request message 354, 360, the console 132 may similarly display an authorization override option, noting that authentication is required to proceed with a service request entered in the network management sub-system 150 due to the existence of a non-interruptible incident response involving a subscriber unit that would be impacted by the service request. Same or similar authentication steps could be executed at dispatch console 132 as at network management console 152. Authentication input received at dispatch console 132 could be authenticated at the dispatch console 132 itself, sent back to the network management sub-system 150 (and the network management computing device) via authentication response message 358, 360, or may be validated at either with the aid of a remote authentication server (e.g., and the result provided back to the network management sub-system 150 via authentication response messages).

At step 370, the network management computing device processes the authorization response, including any authentication information or authentication result included in the response and if it determines that the service request is not authorized, may continue to temporarily suspend the service request. The network management console 152 may indicate the failure of the authorization, and request that the authorization be tried again, or that another authorized user attempt authentication.

A service request that has been temporarily suspended may be configured to expire if not authorized within a particular period of time, such as 30 minutes, 1 hour, or 12 hours. If, on the other hand, the network management computing device determines at step 370 that the authorization was successful, the network management computing device may stop temporarily suspending the service request, and instead allow it to proceed, affecting the indicated impacted subscriber unit(s).

At step 372, and assuming that proper authorization to proceed was received at step 370, the network management computing device provides notification that the service request is proceeding to one or more of services manager sub-systems 154, 134, and 144 (via messages 380, 382, 384, and 392) and dispatch consoles 132 and 142 (via messages 382, 386, 390, and 394). The services manager sub-systems 154, 134, 144 may modify a service record associated with the impacted subscriber units to reflect the removal of one or more services previously provided to the impacted subscriber units, among other possibilities. The dispatch consoles 132, 142 may modify a database of available responders to reflect the newly unavailable status of the impacted subscriber units, among other possibilities. Once the service request is complete, additional notifications sent in a similar manner to messages 380-394 may be transmitted to reinstate the status of the impacted subscriber units.

Figure 4:
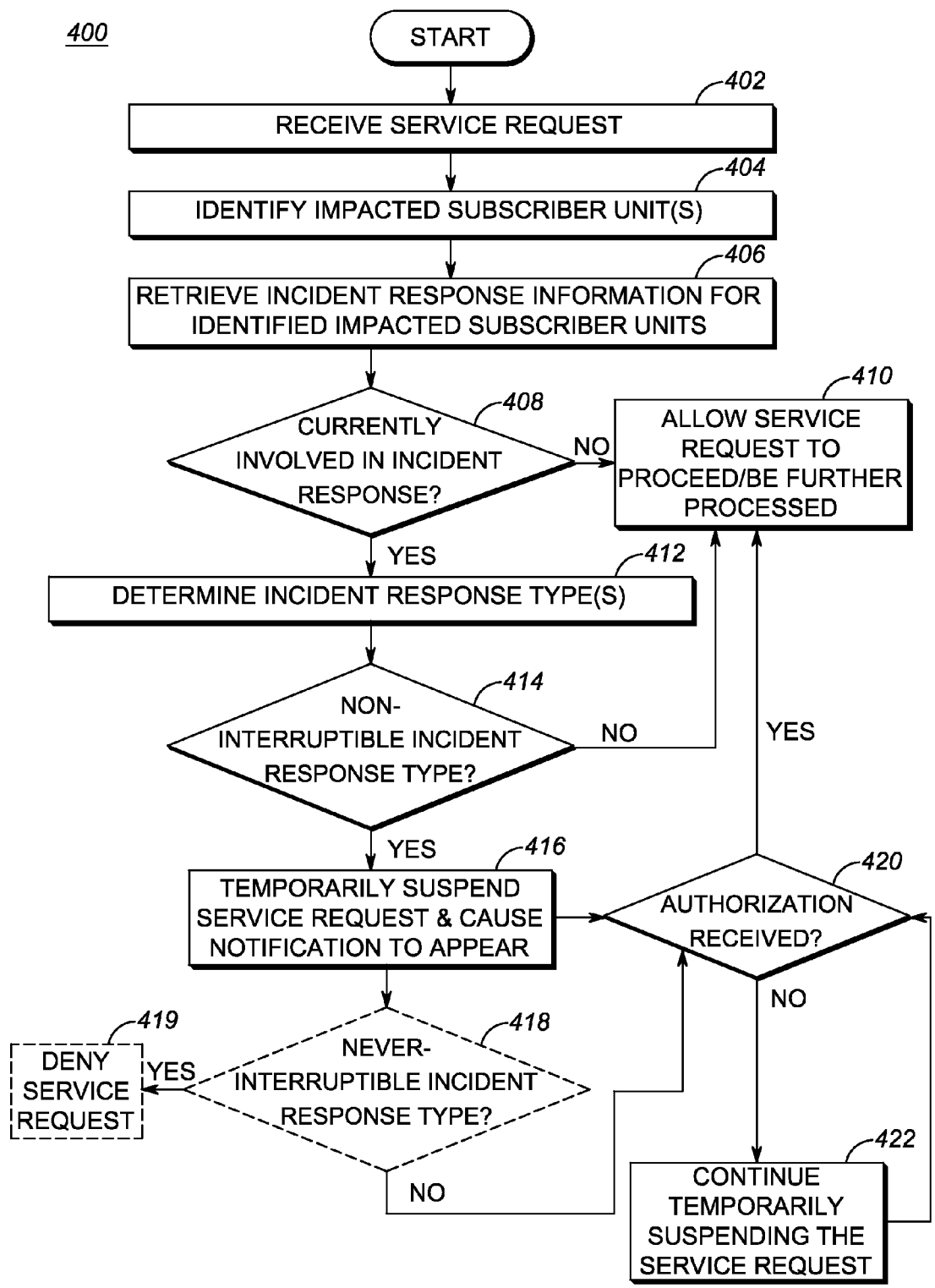
FIG. 4 is a flowchart illustrating a process used by a network management computing device/console to receive and process a service request in accordance with an embodiment of the present disclosure.

FIG. 4 is a flowchart illustrating a process 400 used by a network management console and/or network management computing device to receive and process a service request in accordance with an embodiment of the present disclosure. At step 402, the network management computing device receives a service request, perhaps via a network management console. At step 404, the network management computing device identifies subscriber units that are likely to be impacted by the service request. At step 406, the network management computing device retrieves incident response information for the identified impacted subscriber units, perhaps via coordination with other network devices such as the services managers or consoles of FIGS. 3A and 3B. At step 408, the network management computing device determines, via the incident response information, if any of the identified subscriber units are currently involved in an incident response. If none of the identified impacted subscriber units are currently involved in an incident response, processing can proceed to step 410, where the service request is allowed to proceed and/or is further processed. However, if one or more of the identified impacted subscriber units are currently involved in an incident response, processing proceeds to step 412. At step 412, the network management computing device determines the types of incidents that the identified impacted subscriber units are currently involved in, again perhaps via coordination with other network devices such as the services managers or consoles of FIGS. 3A and 3B.

At step 414, the network management computing device determines whether any of the identified impacted subscriber units are involved in a non-interruptible incident response. If none of the identified impacted subscriber units are involved in a non-interruptible incident response, processing proceeds to step 410, where the service request is allowed to proceed and/or is further processed.

If, on the other hand, at least one of the identified impacted subscriber units is currently involved in a non-interruptible incident response, processing proceeds to step 416, where the service request is temporarily suspended and a notification regarding the temporary suspension of the service request is provided at, for example, the network management console 152 in the network management sub-system 150 of FIGS. 3A and 3B. In one embodiment, in which one a non-interruptible/authorization required incident response type and an interruptible incident response are provided, processing proceeds from step 416 to step 420.

In another embodiment where a third non-interruptible/never interruptible incident response type is provided, processing may proceed from step 416 to step 418, where the network management computing device determines if the non-interruptible incident response is of a never-interruptible type (e.g., the highest priority as set forth above) or an authorization-required type (e.g., the medium priority as set forth above). If the incident response type is of a never-interruptible incident response type, processing proceeds to step 419, where the service request is denied, and perhaps a notification of the denial and the circumstances surrounding the denial (including the incident response type(s) and identified impacted subscriber unit(s)) provided to the device initiating the service request. If, however, the network management computing device determines at step 418 that the response type is of the non-interruptible/authorization-required type, processing may then proceed to step 420.

At step 420, the network management computing device determines whether authorization to proceed has been received, in accordance with any of the authentication methods already set forth above. If authorization to proceed with the service request has not been received, processing proceeds to step 422, where the network management computing device continues to temporarily suspend the service request and periodically loops back to step 420 to determine if authorization has been received. However, if the network management computing device determines at step 420 that authorization has been received, processing continues to step 410, where the service request is allowed to proceed and/or is further processed.

V. Conclusion

In light of the foregoing, an improved system, device, and method is disclosed that is capable of automatically determining what radio sites and/or applications will be impacted by any particular service operation, what subscriber units will be impacted, and whether any of those subscriber units are currently involved in an emergency incident and would be negatively affected by the service operation identified in the service request. As a result, service operations can be conducted with more secure and dependable knowledge that no current incident responses exist that would be negatively affected by the service operation, and without having to delay while manual and undependable inquires into the existence of uninterruptible incident responses are made with individual dispatch agencies.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. In a two-way radio frequency (RF) communications system having a plurality of subscriber units and a supporting infrastructure including at least one fixed terminal and a wireless core network, the method comprising:
   receiving, at a network management console device via an input interface of the network management console or from a subscriber unit via an input/output interface of the network management console, a service request indicating one of a device, application, and transport link in the supporting infrastructure that will be removed from service;
   identifying, by the network management console device, one or more subscriber units out of the plurality of subscriber units that will be impacted by the removal from service;
   determining, by the network management console device via access to agency dispatch information associated with the plurality of subscriber units, whether any one of the one or more subscriber units is currently involved in responding to an incident;
   for each subscriber unit determined to be currently involved in responding to the incident, determining, by the network management console device, a type of the respective incident being responded to and whether the type of the incident is of a non-interruptible incident type; and
   responsive to determining that a particular one of the one or more subscriber units is currently involved in responding to the incident of the non-interruptible incident type:
      causing, by the network management console device, a notification to appear at one of the network management console device and a dispatch console device indicative of the particular subscriber unit and the non-interruptible incident type, and at least temporarily suspending the service request.

2. The method of claim 1, wherein an authorization override option is provided at the network management console and, responsive to receiving a corresponding authorization override instruction at a network management computing device, stopping the temporary suspending of the service request.

3. The method of claim 2, wherein the authorization override instruction is received at the network management computing device responsive to receiving a manual override input instruction at the network management console.

4. The method of claim 3, wherein an authorized operator is authenticated via one or more authentication steps before being allowed to select the authorization override option.

5. The method of claim 4, wherein the one or more authentication steps include one or more of a username, a password, a username and password combination, a smartcard swipe, a challenge/response, and a biometric scan.

6. The method of claim 2, the method further comprising removing the one of the device, application, and transport link in the supporting infrastructure that will be removed from service responsive to one of (i) determining that none of the one or more subscriber units is currently involved in responding to a non-interruptible incident type and (ii) determining that the particular subscriber unit is the only subscriber unit currently involved in responding to a non-interruptible incident type and receiving the authorization override instruction.

7. The method of claim 1, wherein the service request is received responsive to a first user activation of an input interface at the network management console device, and the notification is caused to appear via a display device at the network management console.

8. The method of claim 1, wherein the service request is received from a second particular one of the plurality of subscriber units, and the notification is also caused to appear at a display of the second particular one of the plurality of subscriber units.

9. The method of claim 1, wherein identifying one or more subscriber units out of the plurality of subscriber units that will be impacted by the removal from service comprises accessing one of subscriber unit attachment information and application subscription information stored at a services manager cache in the wireless core network.

10. The method of claim 1, wherein identifying one or more subscriber units out of the plurality of subscriber units that will be impacted by the removal from service comprises transmitting information requests to a services manager device at each of one or more agency dispatch systems associated with one or more agencies being provided with wireless communications services by the RF communication system and receiving a response from each respective agency dispatch system.

11. The method of claim 1, wherein determining whether any one of the one or more subscriber units is currently involved in responding to an incident comprises accessing active incident information stored at a services manager cache in the wireless core network.

12. The method of claim 1, wherein determining whether any one of the one or more subscriber units is currently involved in responding to an incident comprises transmitting an information request to a services manager computing device at each of one or more agency dispatch systems associated with one or more agencies being provided with wireless communications services by the RF communication system, and receiving a response from each services manager computing device indicative of whether any one of the one or more subscriber units associated with each respective agency dispatch system is currently involved in an incident and, if so, the type of incident.

13. A network management computing device operating in a wireless core network of a two-way radio frequency (RF) communications system having a plurality of subscriber units and a supporting infrastructure, the network management computing device configured to:

receive, via an input interface of the network management computing device or from a subscriber unit via an input/output interface of the network management computing device, a service request indicating one of a device, application, and transport link in the supporting infrastructure that will be removed from service;

identify one or more subscriber units out of the plurality of subscriber units that will be impacted by the removal from service;

determine, via access to agency dispatch information associated with the plurality of subscriber units, whether any one of the one or more subscriber units is currently involved in responding to an incident;

for each subscriber unit determined to be currently involved in responding to the incident, determine a type of the respective incident being responded to and whether the type of incident is of a non-interruptible incident type; and responsive to determining that a particular one of the one or more subscriber units is currently involved in responding to the incident of the non-interruptible incident type:
cause a notification to appear at one of the network management computing device and a dispatch console indicative of the particular subscriber unit and the non-interruptible incident type, and at least temporarily suspend the service request.

14. The network management computing device of claim 13, further configured to, responsive to receiving an authorization override instruction, stopping the temporary suspending of the service request.

15. The network management computing device of claim 14, wherein the authorization override instruction is received at the network management computing device from the network management console.

16. The network management computing device of claim 15, wherein the authorization override instruction is accompanied by authentication information, the network management computing device being further configured to authenticate, on its own or with the aid of a remote authentication server, the authentication information before further processing the authorization override instruction.

17. The network management computing device of claim 16, wherein the authentication information includes one or more of a username, a password, a username and password combination, a smartcard swipe, a challenge/response, and a biometric scan associated with an authorized operator.

18. The network management computing device of claim 13, further configured to remove the one of the device, application, and transport link in the supporting infrastructure from service responsive to one of (i) determining that none of the one or more subscriber units is currently involved in responding to a non-interruptible incident type and (ii) determining that the particular subscriber unit is the only subscriber unit currently involved in responding to a non-interruptible incident type and receiving the authorization override instruction.

19. The network management computing device of claim 13, further configured to determine whether any one of the one or more subscriber units is currently involved in responding to an incident response by access active incident information stored at a services manager cache in the wireless core network.

20. The network management computing device of claim 13, further configured to determine whether any one of the one or more subscriber units is currently involved in responding to an incident response by transmitting an information request to a services manager computing device at each of one or more agency dispatch systems associated with one or more agencies being provided with wireless communications services by the RF communication system, and receiving a response from each services manager computing device indicative of whether any one of the one or more subscriber units associated with each respective agency dispatch system is currently involved in an incident and, if so, the type of incident.

* * * * *

UNITED STATES PATENT AND TRADEMARK OFFICE
CERTIFICATE OF CORRECTION

PATENT NO. : 9,008,607 B2  
APPLICATION NO. : 13/687137  
DATED : April 14, 2015  
INVENTOR(S) : Craig A. Ibbotson It is certified that error appears in the above-identified patent and that said Letters Patent is hereby corrected as shown below:

IN THE SPECIFICATION:

In Column 5, Line 54, delete "manger devices" and insert -- manager devices --, therefor.

In Column 6, Line 59, delete "console 150," and insert -- console 152, --, therefor.

In Column 11, Line 49, delete "management 150 sub-system," and insert -- management sub-system 150, --, therefor.

In Column 13, Line 63, delete "inquires" and insert -- inquiries --, therefor.

Signed and Sealed this  
Twelfth Day of July, 2016

Michelle K. Lee  
*Director of the United States Patent and Trademark Office*